(12) United States Patent
McClure

(10) Patent No.: US 7,340,251 B1
(45) Date of Patent: Mar. 4, 2008

(54) SCANNING GUARD TIMER

(75) Inventor: Kenneth McClure, Irving, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/290,090

(22) Filed: Apr. 12, 1999

Related U.S. Application Data

(60) Provisional application No. 60/126,872, filed on Mar. 30, 1999.

(51) Int. Cl.
*H04Q 7/20* (2006.01)

(52) U.S. Cl. .................... 455/434; 455/458; 455/435.1

(58) Field of Classification Search ................ 370/347, 370/337, 313, 314, 328; 455/434, 435, 515, 455/524, 525
See application file for complete search history.

(56) References Cited

U.S. PATENT DOCUMENTS

| | | | |
|---|---|---|---|
| 5,260,988 A | | 11/1993 | Schellinger et al. |
| 5,613,208 A | | 3/1997 | Blackman et al. |
| 5,642,356 A | * | 6/1997 | Wenk .......................... 370/337 |
| 5,910,949 A | * | 6/1999 | Bilstrom et al. ............. 370/337 |
| 6,044,069 A | * | 3/2000 | Wan ............................ 370/311 |
| 6,067,460 A | * | 5/2000 | Alanara et al. .............. 455/574 |
| 6,108,542 A | * | 8/2000 | Swanchara et al. .......... 455/434 |
| 6,119,002 A | | 9/2000 | Alanara ....................... 455/434 |

FOREIGN PATENT DOCUMENTS

WO WO/98 49852 11/1998

* cited by examiner

*Primary Examiner*—Temica Beamer
(74) *Attorney, Agent, or Firm*—Harrington & Smith, PC

(57) ABSTRACT

A method and system of background scanning of an evaluated system by a mobile station without missing paging frames on a registered system. The registered system is defined as the system in which the mobile station has registered and will receive pages. The evaluated system is the system from which the mobile station must retrieve parameters (the possibly higher priority system). The various disclosed embodiments use the periodicity of the paging information to set a guard timer that will force the system back to the registered system before the paging information in the next time slot is missed. After receiving the paging information, the mobile station can continue its search and evaluation of base systems. In other words, the guard timer breaks the background scan into smaller segments that are performed between retrievals of paging information.

33 Claims, 6 Drawing Sheets

SCANNING GUARD TIMER

CROSS-REFERENCE TO RELATED APPLICATION

This application claims priority from Provisional Application Ser. No. 60/126,872, filed 30 Mar. 1999, which is hereby incorporated by reference.

FIELD OF THE INVENTION

This invention relates to background scanning for a more preferred system in mobile communications systems, and particularly to elimination of missed pages during such background scanning.

BACKGROUND OF THE INVENTION

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. The number of time slots in each TDMA frame is related to the number of different users that can simultaneously share the radio channel. If each slot in a TDMA frame is assigned to a different user, the duration of a TDMA frame is the minimum amount of time between successive time slots assigned to the same user. The successive time slots assigned to the same user, which are usually not consecutive time slots on the radio carrier, constitute the user's digital traffic channel (or DTC), which may be considered a logical channel assigned to the user. As described in more detail below, digital control channels (DCCs) can also be provided for communicating control signals, and such a DCC is a logical channel formed by a succession of usually non-consecutive time slots on the radio carrier.

In North America, these features are currently provided by a digital cellular radio telephone system called the digital advanced mobile phone service (D-AMPS), some of the characteristics of which are specified in the interim standard IS-54B, "Dual-Mode Mobile Station-Base Station Compatibility Standard", published by the Electronic Industries Association and Telecommunications Industry Association (EIA/TIA). Interim Standard (IS) 136 (promulgated by the Telecommunications Industry Association) adds a Digital Control Channel (DCCH) to IS-54B. References to IS-54B in this document are meant to incorporate IS-136.

According to IS-54B, each TDMA frame consists of six consecutive time slots and has a duration of 40 milliseconds (ms). Thus, each radio channel can carry from three to six DTCs (e.g., three to six telephone conversations) depending on the source rates of the speech coder/decoders (codecs) used to digitally encode the conversations. Such speech codecs can operate at either full-rate or half-rate, with full-rate codecs being expected to be used until half-rate codecs that produce acceptable speech quality are developed. The TDMA cellular system operates in a buffer-and-burst, or discontinuous-transmission, mode: each mobile station transmits (and receives) only during its assigned time slots. At full rate, for example, a mobile station might transmit during slot 1, receive during slot 2, idle during slot 3, transmit during slot 4, receive during slot 5, and idle during slot 6, and then repeat the cycle during succeeding TDMA frames. Therefore, the mobile station, which may be battery-powered, can be switched off, or sleep, to save power during the time slots when it is neither transmitting nor receiving. In the IS-54B system in which the mobile does not transmit and receive simultaneously, a mobile can sleep for periods of at most about 27 ms (four slots) for a half-rate DTC and about 7 ms (one slot) for a full-rate DTC.

Note that the term mobile station is used herein to refer to a radio unit in a communications system, which includes radio units that are "stationary" or "fixed", and is not limited to being "mobile." The term "mobile" unit is used herein merely because of its wide acceptance and clear meaning in the communications arts.

In addition to voice or traffic channels, cellular radiocommunication systems also provide paging access, or control, channels for carrying call-setup messages between base stations and mobile stations.

In general, the transmission rate of the DCC need not coincide with the half-rate and full-rate specified in IS-54B, and the length of the DCC slots may not be uniform and may not coincide with the length of the DTC slots. The DCC may be defined on an IS-54B radio channel and may consist, for example, of every n-th slot in the stream of consecutive TDMA slots. In this case, the length of each DCC slot may or may not be equal to 6.67 ms, which is the length of a DTC slot according to IS-54B. Alternatively (and without limitation on other possible alternatives), these DCC slots may be defined in other ways known to one skilled in the art.

FIG. 1 shows a general example of a forward DCC configured as a succession of time slots 1, 2, . . . N, . . . belonging to a particular DCC. These DCC slots may be defined on a radio channel such as that specified by IS-54B, and may consist, for example, of every n-th slot in a series of N consecutive slots. The DCC slots shown in FIG. 1 are organized into superframes (SF)', and each superframe includes a number of logical channels that carry different kinds of information. One or more DCC slots may be allocated to each logical channel in the superframe.

Of the slots in a Superframe available for signaling, some are designated by the base station (BMI) for broadcast (point-to-multipoint) messaging and the rest for point-to-point messaging. In order for the base station to be able to notify (or "page") a mobile station (MS) of an incoming call (or other impending transaction), the mobile station is assigned to one and only one of the slots in a Superframe available for point-to-point messaging on the forward DCC (i.e., that portion of the DCC used to transmit messages from the base station to the mobile station).

As used herein, the terms "page" and "page message" refer to one or more slots of data transmitted from a base station over the point-to-point messaging channel that contains information intended to signal one (or possibly more) of a plurality of mobile stations that such mobile stations have an incoming call. (An incoming call can be, for example, a voice call or any other type of incoming call capable of being serviced by the base station and mobile stations.) The term "non-page message" refers to any slots of data transmitted over the point-to-point messaging channel that are not "page messages".

FIG. 1 also shows an exemplary downlink superframe, which includes at least three logical channels: a broadcast control channel (BCCH) including six successive slots for overhead messages; a paging channel (PCH) including one slot for paging messages; and an access response channel (ARCH) including one slot for channel assignment and other messages. The remaining time slots in the exemplary superframe of FIG. 1 may be dedicated to other logical channels, such as additional paging channels or other channels. Since the number of mobile stations is usually much greater than the number of slots in the superframe, each paging slot is used for paging several mobile stations that share some unique characteristic, for example, the last digit of the MIN.

Although IS-54B provides for digital traffic channels, more flexibility is desirable in using digital control channels having expanded functionality to optimize system capacity and to support hierarchical cell structures, i.e., structures of macrocells, microcells, picocells, etc. The term "macrocell" generally refers to a cell having a size comparable to the sizes of cells in a conventional cellular telephone system (e.g., a radius of at least about 1 kilometer), and the terms "microcell" and "picocell" generally refer to progressively smaller cells. For example, a microcell might cover a public indoor or outdoor area, such as a convention center or a busy street, and a picocell might cover an office corridor or a floor of a high-rise building.

From a radio coverage perspective, macrocells, microcells, and picocells may be distinct from one another or may overlap one another to handle different traffic patterns or radio environments. Each of these types of cells has a base station which transmits at least one control channel. Thus, a number of neighboring control channels are present for a mobile or remote unit to evaluate as a possible replacement for the current serving control channel to which it is locked.

Accordingly, DCCs will be periodically evaluated by the mobile station for possible control channel reselection. For example, when in an idle state i.e., switched on but not making or receiving a call, a mobile station in an IS-54B system tunes to and then regularly monitors the strongest control channel (generally, the control channel of the cell in which the mobile station is located at that moment) and may receive or initiate a call through the corresponding base station. Re-tuning is required when the mobile station receives signals from the serving base station (registered station) at such a degraded level that the mobile station is forced to tune to a control channel of a nearby alternative base station.

The initial tuning and subsequent re-tuning to control channels are both accomplished automatically by scanning all the available control channels at their known frequencies to find the best control channel. The terms scan or scanning as used in this document, can refer to, for example, signal strength measurement, actual signal decoding, or any other method of evaluating a signal.

When a control channel with good reception quality is found, the mobile station remains tuned to this channel until the quality deteriorates again. In this way, mobile stations are relatively continuously in communication with the cellular system.

According to a more recent innovation in cell reselection disclosed in U.S. Pat. No. 5,353,332 to Raith and Muller, each control channel in each cell is configured to broadcast information, including system parameters, about the presence, if any, of other cells and the characteristics of those cells including minimum quality criteria, power requirements, etc. Typically, information about the presence of other cells is broadcast about neighboring cells. For instance, a neighboring cell may be adjacent to, overlapping, or non-contiguous from the broadcasting cell.

A mobile periodically scans, during idle mode, the neighboring control channels in the coverage area that the mobile is located in to determine in which cell it should be locked (or registered). This process is known as background scanning. Each control channel includes a neighbor list. The neighbor list identifies other control channels which mobiles locked to that control channel should periodically evaluate. Thus, a mobile may continuously select cells to be locked to based on the existing location of the mobile and quality criteria, such as received signal strength, associated with the cells. The cell to which the mobile may be locked is the cell in which the mobile satisfies the quality criteria associated with the cell.

While in the idle state, and in addition to evaluating control channels as potential reselection candidates, a mobile station must monitor the control channel for paging messages addressed to it. When the base station needs to "page" the mobile station, that is, notify the mobile station that it has an incoming call (or other impending transaction), the base station transmits a "page message" or a "hard page" in the assigned slot for the mobile station. Under quiescent conditions, the mobile station need only monitor this assigned slot in the Superframe. Thus, the mobile station is able to "sleep" while the other 31 slots of the Superframe are being transmitted. In addition, because every other Superframe transmitted (i.e., every primary Superframe) by the base station is followed by a Superframe (secondary Superframe) having identical point-to-point paging slots, the mobile unit can sleep during every other entire Superframe. For other types of point-to-point traffic, however, the mobile station is not assigned to a specific slot in a Superframe; rather, when it is expecting a "non-page message," i.e., not a message intended to notify the mobile station of an incoming call (or other impending transaction), from the base station, the mobile station is required to search for non-page messages addressed to itself in each slot available for point-to-point messaging within the Superframe.

Currently, mobile stations are hashed to a slot in the Superframe (called a PCH Subchannel) where the mobile station expects to receive page traffic. Nominally, the mobile station is required to read this same slot in every other Superframe.

FIG. 2 depicts a block diagram of the various elements in a time division multiple access digital control channel. A TDMA Frame 200 is depicted which is made up of six slots 202, 204, 206, 208, 210, 212. Each slot 202, 204, 206, 208, 210, 212 is transmitted through the communications channel, consisting primarily of air, during a 6.67 ms period of time, such that the TDMA Frame 200 is 40 ms in duration. In accordance with current TDMA conventions, a TDMA channel is made up of every third slot within the TDMA Frame. Thus, slots 1 and 4 (202, 208) are a part of one TDMA channel, slots 2 and 5 (204, 210) part of another TDMA channel, and slots 3 and 6 (206, 212) yet another.

Within each TDMA channel, groups of 32 TDMA blocks (and thus 32 slots) comprise a Superframe 214, having a duration of 640 ms. A total of three Superframes, one per TDMA channel, is transmitted every 640 ms. Within each Superframe 214, a portion of the slots is designated as the Broadcast Channel (BCCH), another portion Reserved, and another portion the point-to-point messaging channel. Each mobile unit monitoring a particular base station is assigned to monitor a particular PCH subchannel, i.e., a particular slot within the point-to-point messaging channel.

As an example, slot 24 (216) may be the monitored PCH subchannel for a particular group of mobile units within a cell (assuming for a given case slot 24 is part of the point-to-point messaging channel). The PCH subchannel may contain any of a plurality of point-to-point communications encoded in 324 bits, which make up the PCH subchannel.

The mobile unit, is not always monitoring the digital control channel (DCCH) for Page Messages. Each slot in a given digital control channel has a specified function (in accordance with IS-136). Some, called broadcast control channel (BCCH) slots, are allocated to carry overhead information to all mobile stations that may be monitoring a particular digital control channel (point-to-many). Others, called Short Message Service, Paging, and Access Response Channel (SPACH) slots, are used by the base station to carry point-to-point Messages to a specific mobile station. Together the BCCH and the SPACH (as possibly some Reserved slots) comprise a Superframe. Each Superframe is made up of a total of thirty-two slots (in a full-rate DCCH), each allocated as a BCCH slot or a SPACH slot (or possibly a Reserved slot). Superframes are transmitted in pairs referred to as Primary and Secondary Superframes, respectively. In a quiescent system, the mobile station is only required to monitor a single SPACH slot (called its Paging Channel (PCH) Subchannel) in every other Superframe, i.e., in every Primary Superframe.

In digital cellular systems, there are several standards requiring the mobile station to search for a system while registered on another (background scanning). This search takes place on the mobile station without any assistance from the base station (as in reselection or handoff). Furthermore, this search takes place without any coordination between the mobile station and the base station.

There are currently several specifications requiring this type of background scanning. For example, Intelligent Roaring for ANSI 136 utilizes a database to determine the priority of a system. While registered on certain low priority systems, the mobile station must search for a system of higher priority.

Another example of a specification requiring background scanning is the Inter-Network Roaming Selection specification from GSM North America (GSM NA). This specification requires a priority database to determine the best system in AMPS and GSM 1900. While registered to a low priority system, the mobile station must search another protocol for a higher priority system. The ANSI-136 Intelligent Roaming and Inter-Network Roaming Selection specifications are the first of many specifications dealing with prioritized system selection requiring background scanning.

The drawback of background scanning, however, is that, during the period of time the mobile station is retrieving identification parameters from the base system under investigation (or evaluation) as a possibly better system, the mobile station can miss pages on the system to which it is registered. This aspect of the background scanning is addressed in the Intelligent Roaming specification by forcing the base station to repeat a missed page after five seconds. This gives a mobile station in the TDMA/AMPS environment a second chance to receive the page.

The GSM NA specification does not address this possibility of missed pages. Therefore, a mobile station conforming to the GS NA standard can fatally miss a page if the unrepeated page goes undetected by the mobile station.

SUMMARY OF THE INVENTION

The present invention discloses a method and system of background scanning of a base system under evaluation by a mobile station without missing pages on the registered system. The registered system is defined as the system in which the mobile station has registered and will receive pages. The system under evaluation is the system from which the mobile station must retrieve system parameters (the possibly higher priority system). The various disclosed embodiments use the periodicity of the paging information to set a guard timer that will force the mobile station back to the registered system before the paging information in the next time slot is missed. After receiving the paging information, the mobile station can continue its search and evaluation of base systems. In other words, the guard timer breaks the background scan into smaller segments that are performed between retrievals of paging information.

One or more of the disclosed embodiments provides at least the following advantages:

Ability to operate in a dual-mode (or greater) environment without regard to particular paging protocols.

Reduction in missed pages occurring during base system evaluation;

Reduced traffic on paging channels by eliminating the need to force a base station to repeat a page after 5 seconds of no response; and Faster mobile station responses to base system paging.

In an embodiment of the invention, a mobile station receives its paging frame from the base station on which it is currently registered. Receipt of the paging frame triggers a scanning guard timer timing sequence. During the timing sequence, the mobile station scans and evaluates an other base station. At the end of the timing sequence, the scanning guard timer forces the mobile station to stop scanning and switch back to the registered station to receive the next paging frame from the registered base station.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein.

The guard timer provides a method to return to a mobile station to a registered system from a background scan (on a system under evaluation) so that no paging frame is missed. The guard timer is a control program loaded and executed by the mobile station immediately after the it receives the paging frame (slot, or equivalent) that is responsible for containing any paging information for the mobile station. The guard timer is set to expire after a controlled time period allowing the mobile to receive the next paging frame (or equivalent) that is responsible for containing any paging information for the mobile station.

Figure 1:
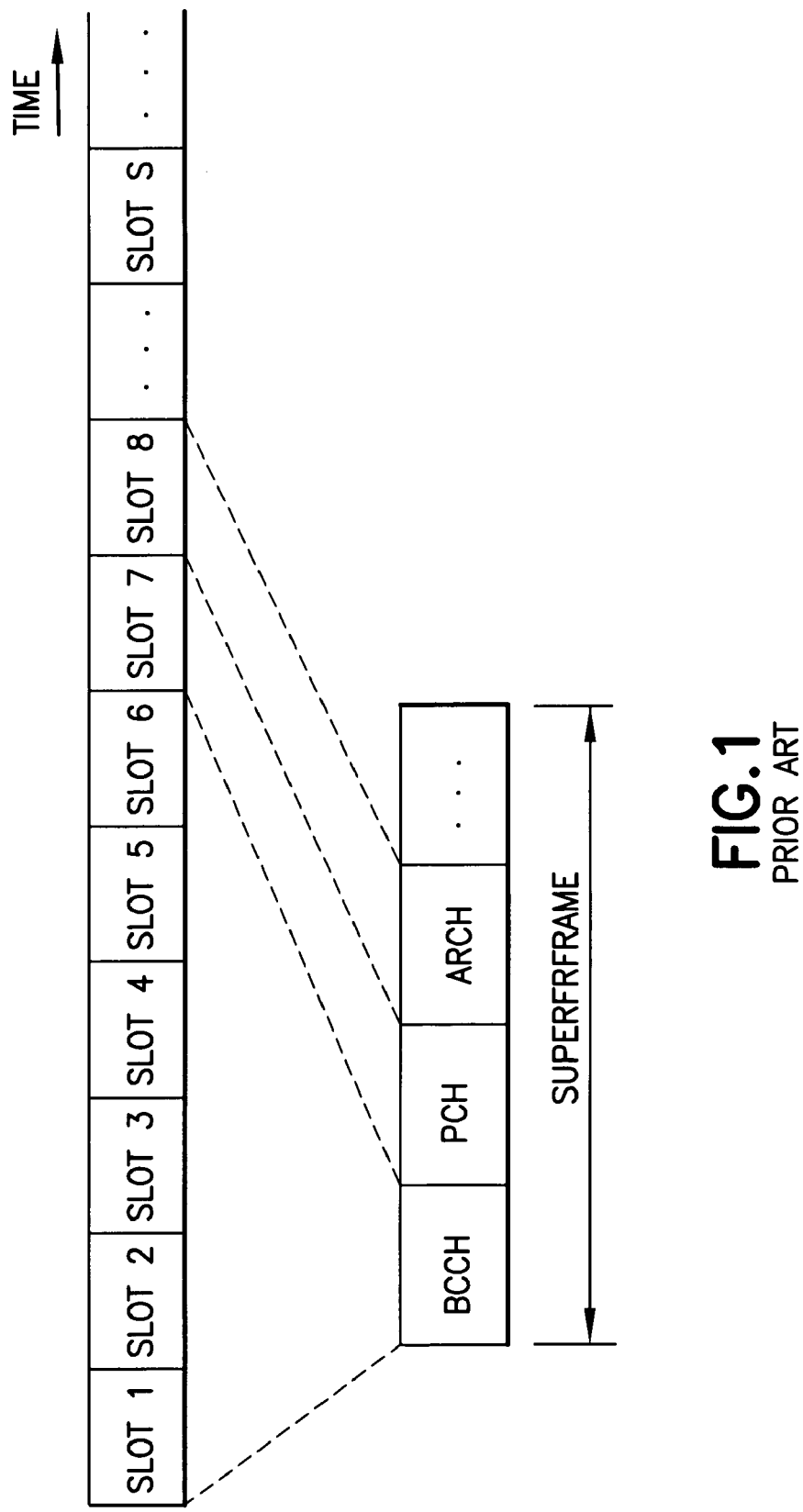
FIG. 1 shows a general example of a forward DCC configured as a succession of time slots 1, 2, . . . , N, . . . belonging to a particular DCC.
Figure 2:
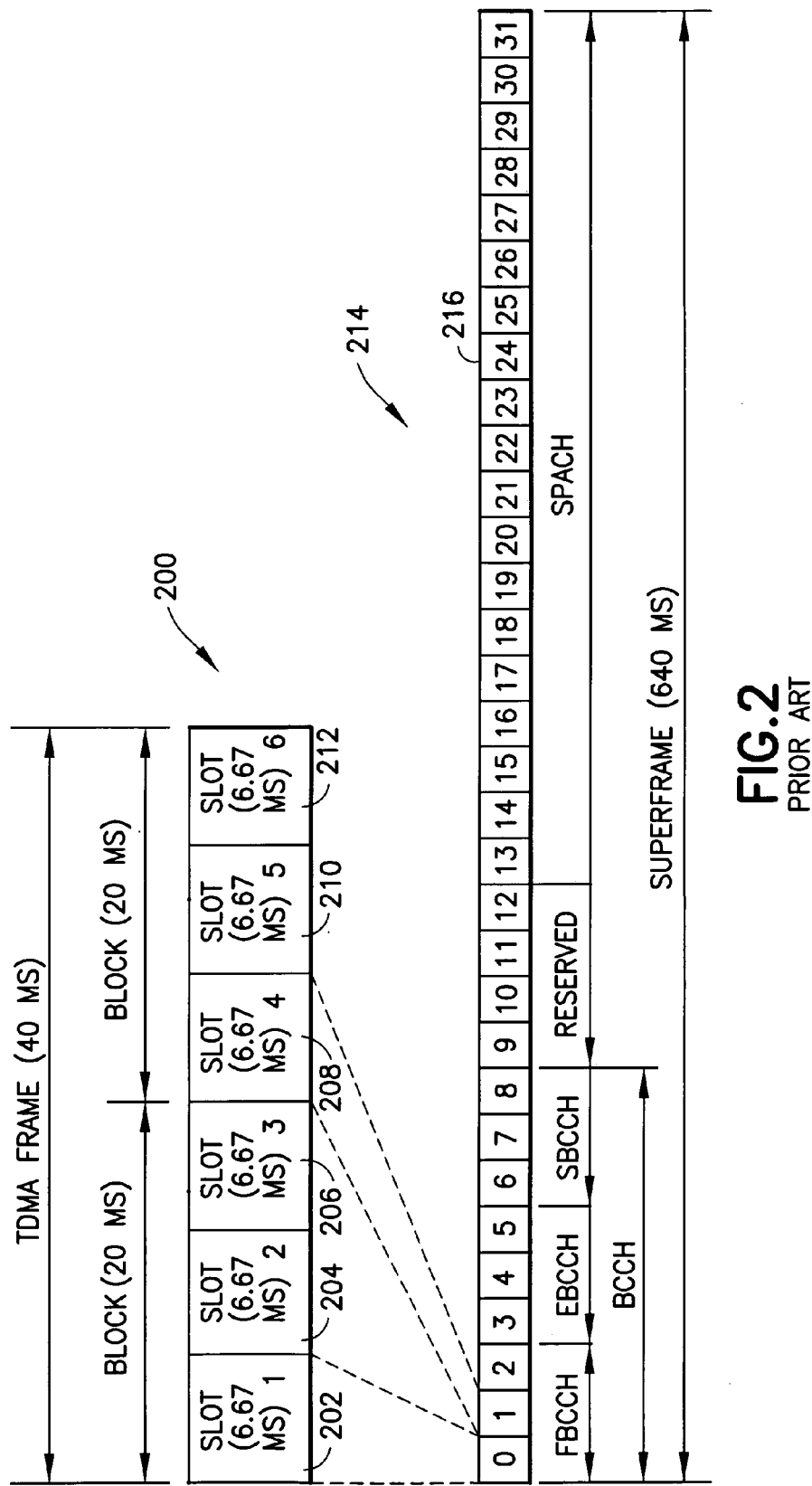
FIG. 2 depicts a block diagram of the various elements in a time division multiple access digital control channel.
Figure 3:
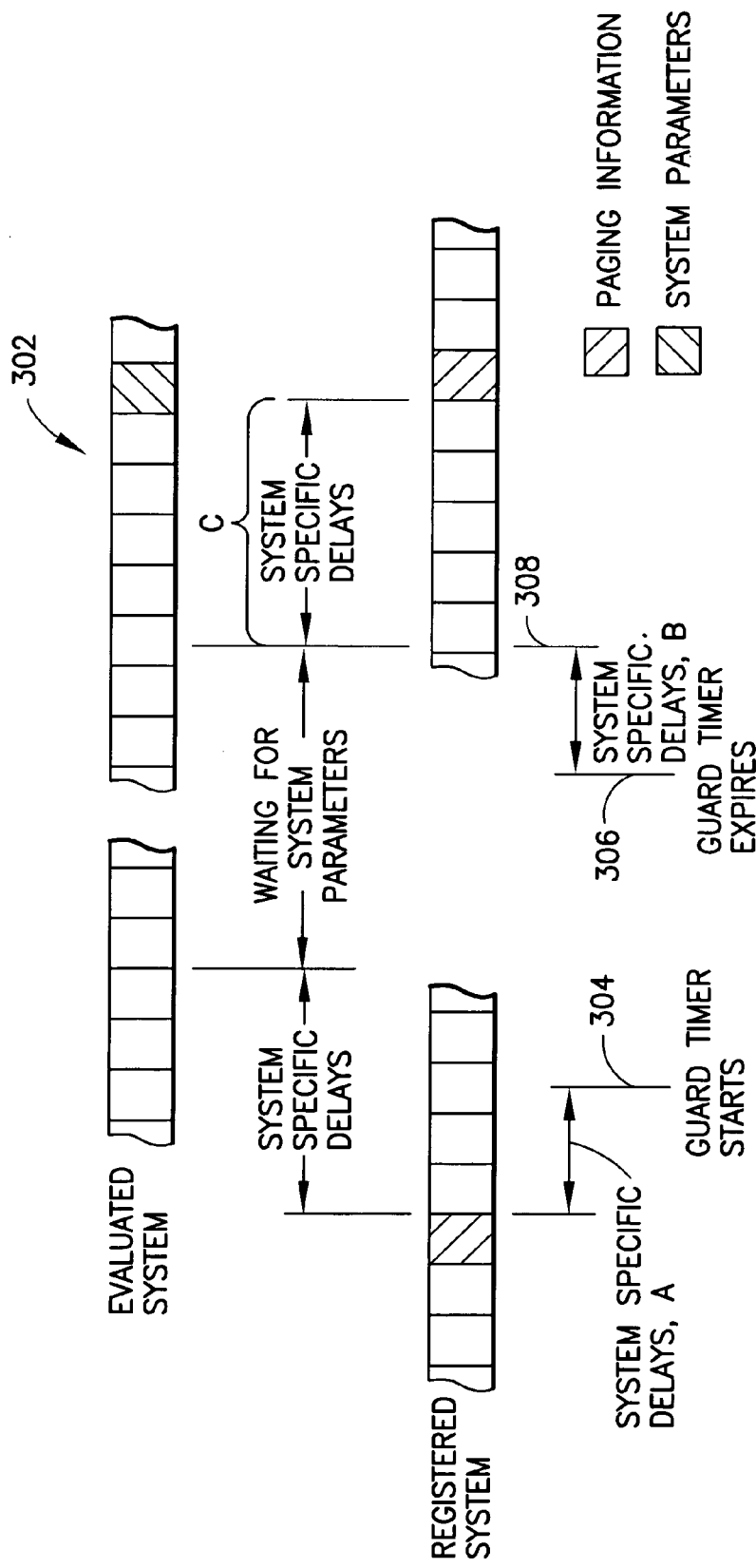
FIG. 3 depicts expiration of the guard timer prior to receiving system parameters.

FIG. 3 depicts expiration of the guard timer prior to receiving system parameters. After receiving a paging frame, the mobile station starts the guard timer at time hash 304. A system specific delay (represented by A) denotes the delay time, if any, in the mobile station that occurs between receiving of the paging frame and starting the guard timer. Such system specific delays can include, for example, software and hardware execution delays, task switching, and other system functions that delay the mobile station in switching its receiver to process the alternative frequency of the evaluated system. Such delays are system (hardware and software) dependent, differing depending on mobile station architecture. Other delays can include, for example, delays due to the physical movement of the mobile station in between paging frames or other ambiguities in the distance of the mobile station from the base station due to the movement of the mobile station. In the example depicted in FIG. 3, system parameters for the evaluated system are being transmitted in frame 302. Before any system parameters are received from the base system being evaluated, the guard timer expires at time hash 306. The mobile station, then begins to switch from monitoring the evaluated system to monitoring the registered system. A second system specific delay (represented by B) denotes the delay time, if any, in the mobile station that occurs between the expiration of the guard timer 306 and the switch of the mobile receiver from the evaluated system back to the registered system, at time hash 308. Again, such system specific delays can include, for example, software and hardware execution delays, task switching, and other system functions that delay the mobile station in switching its receiver to process the alternative frequency of the evaluated system. Such delays are system (hardware and software) dependent, differing depending on mobile station architecture. The system specific delay (represented by C) denotes the delay time, if any, required by the mobile station in switching back to the registered system and the time when the mobile station is capable of successfully processing a paging frame (synchronization time). Such system specific delays can include, for example, software and hardware execution delays, task switching, and other system functions that delay the mobile station in switching its receiver to process the alternative frequency of the evaluated system. Such delays are system (hardware and software) dependent, differing depending on mobile station architecture. Since the parameters 302 were not received, the mobile station will repeat this process again after processing the paging frame.

In the presently preferred embodiment, the period for the guard timer must take into account the delays mentioned above (A, B, and C). The guard timer should be set no greater than the sum of these delays subtracted from the period of time between paging frames or between same numbered frames in a superframe.

Figure 5:
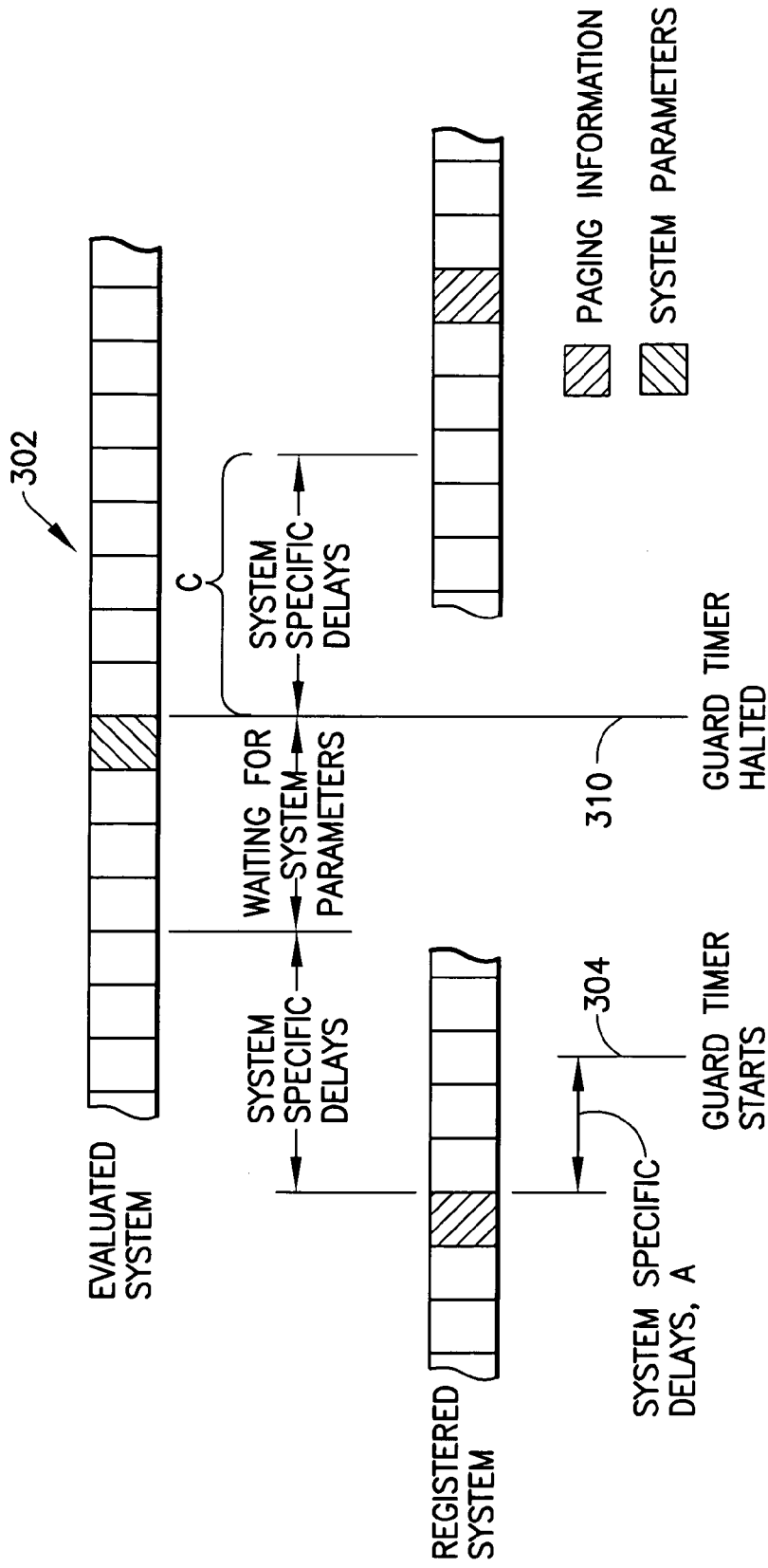
FIG. 5 depicts the guard timer being halted after receiving system parameters.

FIG. 5 depicts the guard timer being halted after receiving system parameters. In FIG. 5, after receiving the paging frame, the mobile station starts the guard timer. The mobile station receives the system parameters 302 from the evaluated system before the expiration of the guard timer. The guard timer is halted, at time hash 310, and the mobile station switches back to the registered system (after C delays) with ample time to receive the next paging frame.

Figure 4:
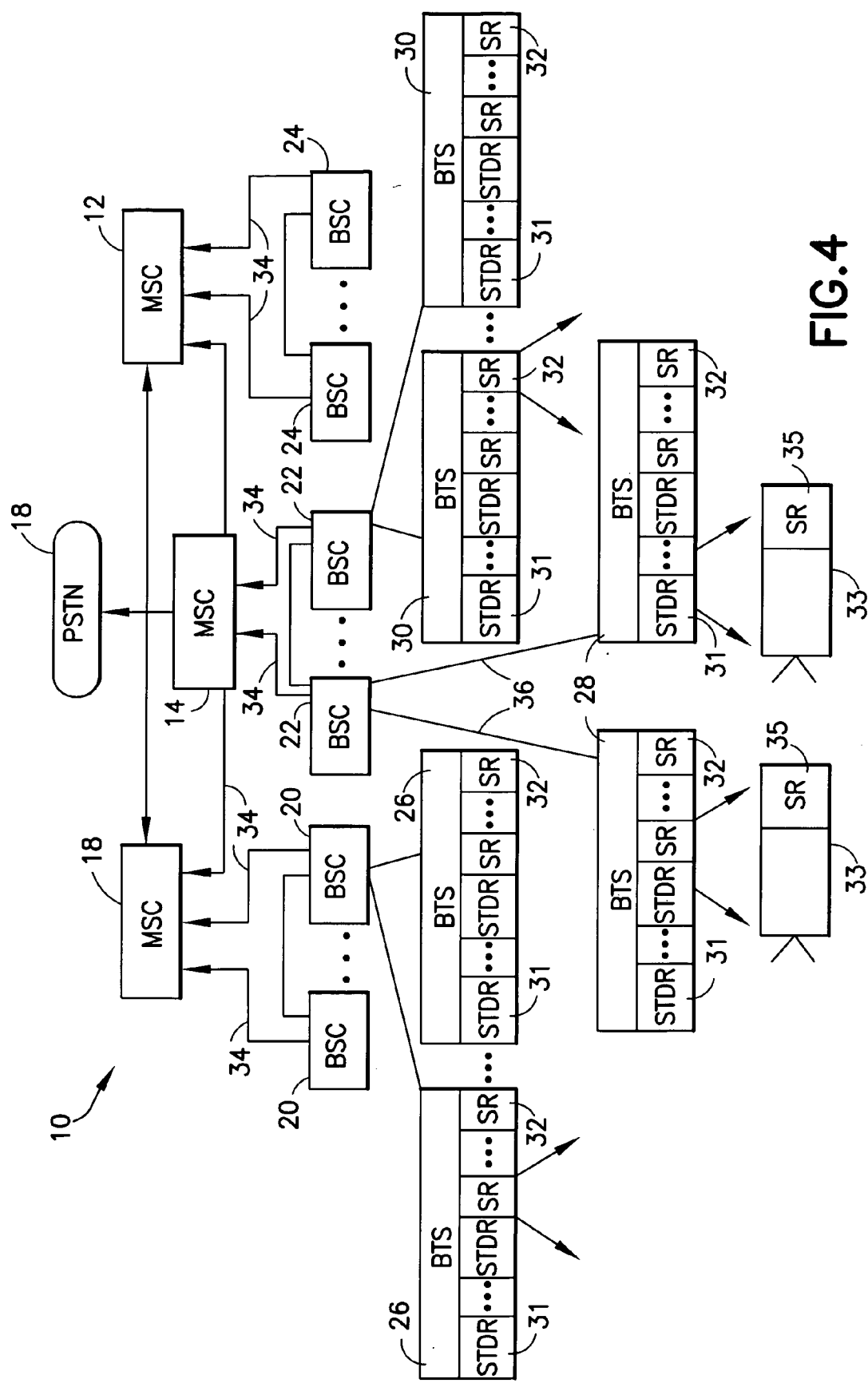
FIG. 4 depicts a block diagram of a cellular communications system suitable for implementing the disclosed embodiments.

FIG. 4 depicts a block diagram of a cellular communications system suitable for implementing the disclosed embodiments. A cellular telephone system 10 has a plurality of mobile switching centers (MSC) 12, 14, 16, or mobile telephone switching offices (MTSO), that are connected to each other and to a public switched telephone network (PSTN) 18. Each of the mobile switching centers is connected to a respective group of base station controllers (BSC) 20, 22, 24. Each base station controller is connected to a group of individual base transceiver stations (BTS) 26, 28, 30. Each base transceiver station of the groups 26, 28, 30 defines an individual cell of the cellular telephone system.

Each base transceiver station of the groups 26, 28, 30 includes hardware and software functions required to communicate over communications channels of the system 10; and includes transmitters and receivers for communication with mobile telephone units. Each base transceiver station 26, 28, 30 also includes a plurality of individual standard receivers (StdR) 31 and scanning receivers (SR) 32 for scanning selected portions of the communications channel. Each base transceiver station 26, 28, 30 further includes digital multiplex equipment for transmission of audio traffic to its associated base station controller. It is the base transceiver stations 26, 28, 30, along with their associated base station controllers 20, 22, 24 and mobile switching centers, that perform the steps described herein in order to carry out one embodiment of the invention.

A plurality of digital mobile stations 33 is used with the system 10 for communication over the communications channel (or radio frequency traffic channel) with a particular base transceiver station of a particular cell in which the particular base transceiver station is located. According to the various disclosed embodiments, associated with each digital mobile station 33 is a scanning receiver 35 for scanning selected portions of the communications channel between the mobile unit 33 and the base transceiver station of serving and neighboring cells.

Each base station controller of the groups 20, 22, 24 implements audio compression/decompression, handles call establishment, disconnect, and handoff procedures, and allocates system resources between the individual base transceiver stations 26, 28, 30 associated with each of the base station controllers 20, 22, 24. More specifically, each base station controller performs handoff execution for transferring on-going communications from one cell to another within the group of base transceiver stations connected to the particular base station controller. Each base station controller communicates with its associated mobile switching center for effecting a handoff involving a cell or base transceiver station associated with a different base station controller. Each mobile switching center 12, 14, 16 processes all requests for calls, switching functions, as well as the mobility functions of registration, authentication and handoff.

Figure 6:
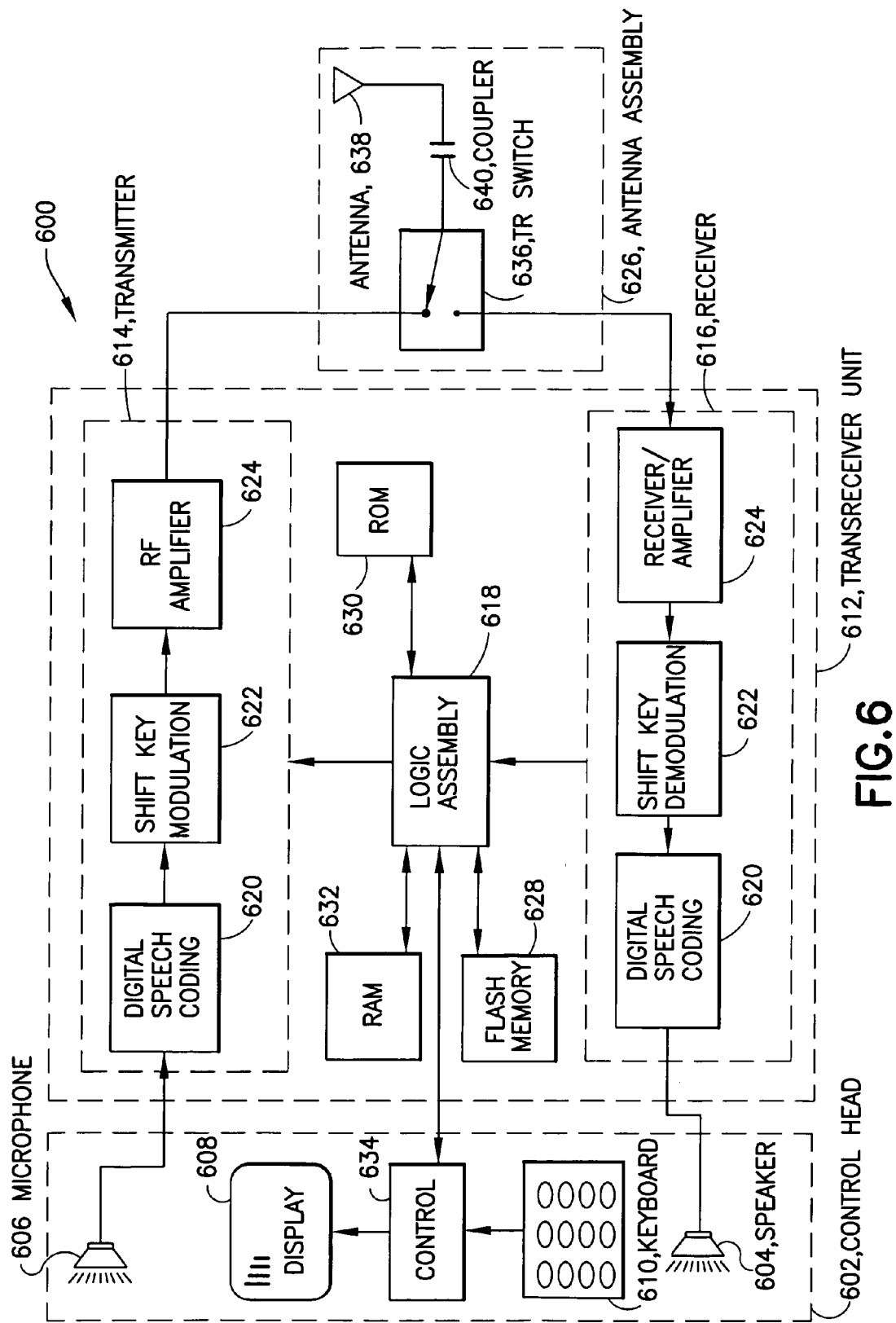
FIG. 6 depicts a block diagram of a mobile station that can make use of the disclosed embodiments.

FIG. 6 depicts a block diagram of a mobile station 600 that can make use of the disclosed embodiments (like 33 and 35 described in FIG. 4). The mobile station 600 includes, in this example:

A control head 602 containing an audio interface, i.e. a speaker 604 and microphone 606. The control head 602 generally includes a display assembly 608 allowing a user to see dialed digits, stored information, messages, calling status information, including signal strength, etc. The control head generally includes a keypad 610, or other user control device, allowing a user to dial numbers, answer incoming calls, enter stored information, and perform other mobile station functions. The control head also has a controller unit 634 that interfaces with a logic control assembly 618 responsible, from the control unit perspective, for receiving commands from the keypad 610 or other control devices, and providing status information, alerts, and other information to the display assembly 608;

A transceiver unit 612 containing a transmitter unit 614, receiver unit 616, and the logic control assembly 618. The transmitter 614 converts low-level audio signals from the microphone 606 to digital coding using a codec (a data coder/decoder) 620. The digitally encoded audio is represented by modulated shifts, for example, in the frequency domain, using a shift key modulator/demodulator 622. Other codes transmission utilized by the logic control assembly 618, such as station parameters and control information, may also be encoded for transmission. The modulated signal is then amplified 624 and transmitted via an antenna assembly 626;

The antenna assembly 626 contains a TR (transmitter/receiver) switch 636. The TR switch 636 is used to prevent simultaneous reception and transmission of a signal by the mobile station 600. The antenna assembly also contains at least one antenna 638. Optionally, a different antenna may be coupled 640 to the antenna assembly.

A receiver unit which receives a transmitted signal via the antenna assembly 626. The signal is amplified 624 and demodulated 622. If the signal is an audio signal, it is decoded using the codec 620. The audio signal is then reproduced by the speaker 604. Other signals are handled by the logic control assembly 618 after demodulation 622; and A logic control assembly 618 usually containing an application specific integrated circuit (or ASIC) combining many functions, such as a general purpose microprocessor, digital signal processor, and other functions, into one integrated circuit. The logic control assembly 618 coordinates the overall operation of the transmitter and receiver using control messages. The various disclosed embodiments make use of the logic control assembly to control scanning and evaluation of other base stations. Generally, the logic control assembly operates from a program that is stored in flash memory 628 of the mobile station. Flash memory 628 allows upgrading of operating software, software correction or addition of new features. Flash memory 628 is also used to hold user information such as speed dialing names and stored numbers. The various disclosed embodiments typically function from this or another section of the mobile station's memory.

In addition to flash memory 628, the mobile station will typically contain read only memory (ROM) 630 for storing information that should not change, such as startup procedures, and random access memory (RAM) 632 to hold temporary information such as channel number and system identifier.

In general, statements made in the specification of the present application do not necessarily delimit any of the various claimed inventions. Moreover, some statements may apply to some inventive features but not to others. As will be recognized by those skilled in the art, the innovative concepts described in the present application can be modified and varied over a tremendous range of applications, and accordingly the scope of patented subject matter is not limited by any of the specific exemplary teachings given.

For example, other wireless telecommunications standards, currently in existence or which may be created, may require different responses and evaluations of neighboring base systems. In turn, the guard timer or evaluation duration may need to be lengthened or shortened. Further, differing frame patterns or timing alterations may require changes in the guard timer.

As processor times increase and system specific delays decrease, it may become possible to evaluate more than one other base station between the paging frames of a registered base station. In such a case, modifications to the guard timer incorporating re-tuning to several frequencies and other delays may have to be incorporated.

As described above, mobile station architecture can affect the A, B, and C delay times. It is possible that some architectures may reduce one or more of these times to effectively zero.

Some standards in wireless communication can lengthen the page message times to be longer than one frame. For example, point-to-point message continuation is the process by which the base station sends a message over multiple point-to-point messaging slots. A mobile station responds to point-to-point messaging channel message continuation whenever it determines that a message addressed to its mobile station identification (MSID) number, sent by the base station, occupies more than one point-to-point messaging slot. A page message spanning more than 1 point-to-point messaging slot, when sent on a full-rate digital control channel, is transmitted using every other point-to-point messaging slot. A page message spanning more than 1 point-to-point messaging slot, when sent on a half-rate digital control channel, is transmitted using consecutive point-to-point messaging slots. If a page requiring more than one paging frame or slot is to be received, guard timing will need to be adjusted.

Additional general background, which helps to show the knowledge of those skilled in the art regarding the system context, and of variations and options for implementations, may be found in the following: TIA interim standards IS-136 and IS-54B; and Brodsky, Wireless: The Revolution in Personal Telecommunications (1995); all of which are hereby incorporated by reference.

What is claimed is:

1. A method of evaluating a base station without missing a digital control channel paging frame, comprising:
   receiving a first paging frame from a digital control channel transmitted by a first base station;
   initiating a timing sequence after receiving said first paging frame;
   prior to completion of the initiated timing sequence, scanning for system parameters from a digital control channel of at least one second base station; and
   receiving a second paging frame from the digital control channel transmitted by said first base station.

2. The method of claim 1, further comprising halting scanning when said system parameters from said at least one second base station are received.

3. The method of claim 1, wherein said second paging frame is a next paging frame which immediately follows said first paging frame.

4. The method of claim 1, wherein a duration of scanning is limited to a predetermined amount of time, said predetermined amount of time being dependent on an amount of time between said first and second paging frames.

5. The method of claim 1, wherein a duration of scanning is limited to a predetermined amount of time, said predetermined amount of time being dependent on mobile station architecture.

6. The method of claim 1, wherein a duration of scanning is limited to a predetermined amount of time, said predetermined amount of time being dependent on an amount of time required to switch from receiving the first paging frame to scanning and from scanning to receiving the second paging frame.

7. The method of claim 1, performed by a mobile station.

8. A method of evaluating a base station without missing a digital control channel paging frame, comprising:

initiating a timing sequence after receiving a first paging frame from a digital control channel transmitted by a first base station;

selecting at least one second base station to be evaluated during said timing sequence;

prior to completion of the initiated timing sequence, scanning said at least one second base station transmissions for system parameters; and receiving a second paging frame from said digital control channel transmitted by the first base station.

9. The method of claim 8, further comprising halting scanning when said system parameters from said at least one second base station are received.

10. The method of claim 8, wherein said second paging frame is a next paging frame which immediately follows said first paging frame.

11. The method of claim 8, wherein a duration of scanning is limited to a predetermined amount of time, said predetermined amount of time being dependent on mobile station architecture.

12. The method of claim 8, wherein a duration of scanning is limited to a predetermined amount of time, said predetermined amount of time being dependent on an amount of time between said first and second paging frames.

13. The method of claim 8, wherein a duration of scanning is limited to a predetermined amount of time, said predetermined amount of time being dependent on an amount of time required to switch from receiving the first paging frame to scanning and from scanning to receiving the second paging frame.

14. The method of claim 8, performed by a mobile station.

15. A system of wireless base station and mobile station communication, comprising:

first and second base stations transmitting digital control channel paging frames and system parameters; and a mobile station registered with and receiving digital control channel paging frames from said first base station;

wherein said mobile station is adapted to respond to a receipt of a first digital control channel paging frame from said first base station to trigger evaluation of said second base station based at least on transmitted system parameters of said second base station without missing a next digital control channel paging frame that is transmitted from said first base station.

16. The system of claim 15, wherein said mobile station is adapted to receive a transmission from said second base station only during a predetermined period of time, said predetermined period of time being dependent on at least an architecture of said mobile station.

17. The system of claim 15, wherein said mobile station is adapted to receive a transmission from said second base station only during a predetermined period of time, said predetermined period of time being dependent on at least an amount of time between said digital control channel paging frames for said mobile station transmitted by said first base station.

18. The system of claim 15, wherein said mobile station is adapted to receive a transmission from said second base station only during a predetermined period of time, said predetermined period of time being dependent on at least an amount of time required for said mobile station to switch from receiving the first digital control channel paging frame transmitted by said first base station to receiving said system parameters transmitted by said second base station, and to switch back to receive the next digital control channel paging frame transmitted by said first base station.

19. A mobile station, comprising:

a transceiver unit, comprising a transmitter;

a receiver; and a logic control assembly that comprises a guard timer used to control operation of said transceiver unit to scan for transmitted parameters of at least one base station under evaluation without missing digital control channel paging frames transmitted from a registered base station to said mobile station, wherein said transceiver unit receives said parameters only during a predetermined period of time set by said guard timer that is dependent on an amount of time between said digital control channel paging frames for said mobile station transmitted by said registered base station.

20. The mobile station of claim 19, wherein receipt of a first digital control channel paging frame from said registered base station triggers said logic control assembly to initiate operation of said guard timer and to cause said transceiver unit to scan for said at least one base station under evaluation.

21. The mobile station of claim 19, further comprising memory and said logic control assembly executes programs in said memory to control said transceiver unit, said guard timer, and to evaluate said transmitted parameters.

22. The mobile station of claim 19, wherein said transceiver unit receives said parameters only when said registered base station is not transmitting said digital control channel paging frames.

23. The mobile station of claim 19, wherein said transceiver unit stops scanning for said parameters once said parameters are received.

24. The mobile station of claim 19, wherein said transceiver unit can receive said parameters only during a predetermined period of time, said predetermined period of time being dependent on at least an architecture of said mobile station.

25. The system of claim 19, wherein said transceiver unit is adapted to receive a transmission from the at least one second base station under evaluation only during a predetermined period of time set by said guard timer, said predetermined period of time being dependent on at least an amount of time required for said mobile station to switch from receiving a digital control channel paging frame transmitted by said registered base station to receiving system parameters transmitted by said at least one base station under evaluation, and to switch back to receive a next digital control channel paging frame transmitted by said registered base station.

26. An integrated circuit, comprising:

control circuitry adapted to implement a guard timer and to control operation of a radio frequency receiver to receive a system parameter-containing transmission from a first base station under evaluation during a predetermined period of time set by said guard timer, said predetermined period of time being dependent on at least an amount of time required to switch the radio frequency receiver from receiving a digital control channel paging frame transmitted by a second base station to receiving the system parameter-containing transmission transmitted by said first base station under evaluation, and to switch back to receive a next digital control channel paging frame transmitted by said second base station.

27. An integrated circuit as in claim 26, embodied in a mobile station, where said second base station is a base station to which the mobile station is currently registered.

28. An integrated circuit as in claim 26, where said digital control channel paging frame as received comprises a paging message sent over a full-rate digital control channel.

29. An integrated circuit as in claim 26, where said digital control channel paging frame as received comprises a paging message sent over a half-rate digital control channel.

30. A computer program product embodied in a tangible memory medium and comprising instructions the execution of which by a data processor result in operations that comprise controlling operation of a radio frequency receiver to receive a system parameter-containing transmission from a first base station under evaluation during a predetermined period of time set by a guard timer, said predetermined period of time being dependent on at least an amount of time required to switch the radio frequency receiver from receiving a digital control channel paging frame transmitted by a second base station to receiving the system parameter-containing transmission transmitted by said first base station under evaluation, and to switch back to receive a next digital control channel paging frame transmitted by said second base station; and evaluating parameters received from the first base station.

31. A computer program product as in claim 30, embodied in a mobile station, where said second base station is a base station to which the mobile station is currently registered.

32. A computer program product as in claim 30, where said digital control channel paging frame as received comprises a paging message sent over a full-rate digital control channel.

33. A computer program product as in claim 30, where said digital control channel paging frame as received comprises a paging message sent over a half-rate digital control channel.

* * * * *